(12) United States Patent
Montgomery

(10) Patent No.: US 8,944,027 B2
(45) Date of Patent: Feb. 3, 2015

(54) DUAL FUEL INJECTION COMPRESSION IGNITION ENGINE AND METHOD OF OPERATING SAME

(75) Inventor: David Montgomery, Edelstein, IL (US)

(73) Assignee: Caterpillar Inc., Peoria, IL (US)

( * ) Notice: Subject to any disclaimer, the term of this patent is extended or adjusted under 35 U.S.C. 154(b) by 822 days.

(21) Appl. No.: 13/164,815

(22) Filed: Jun. 21, 2011

(65) Prior Publication Data

US 2012/0325180 A1    Dec. 27, 2012

(51) Int. Cl.
*F02B 5/00* (2006.01)
*F02M 43/00* (2006.01)
*F02D 41/00* (2006.01)
*F02D 41/30* (2006.01)
*F02D 41/40* (2006.01)
*F02M 21/02* (2006.01)
(Continued)

(52) U.S. Cl.
CPC ........ *F02D 41/0027* (2013.01); *F02D 41/3094* (2013.01); *F02D 41/403* (2013.01); *F02M 21/0287* (2013.01); *F02D 19/061* (2013.01); *F02D 19/0647* (2013.01); *F02D 19/0684* (2013.01); *F02D 19/0694* (2013.01); *F02D 19/081* (2013.01); *F02M 21/0254* (2013.01); *F02M 43/04* (2013.01); *F02M 45/086* (2013.01); *F02M 63/0064* (2013.01); *F02D 41/3035* (2013.01); *Y02T 10/44* (2013.01); *Y02T 10/32* (2013.01); *F02M 2200/44* (2013.01); *F02M 2200/46* (2013.01); *F02M 2200/701* (2013.01)
USPC .......................................... 123/299; 123/304

(58) Field of Classification Search
CPC . F02D 41/402; F02D 41/403; F02D 41/3017; F02D 41/3035; F02D 19/0694; F02D 19/081

USPC ........... 123/299, 304, 525; 701/103, 104, 105
See application file for complete search history.

(56) References Cited

U.S. PATENT DOCUMENTS 4,499,862 A    2/1985    Bäumer et al.
4,700,672 A    10/1987    Baguena
(Continued)

FOREIGN PATENT DOCUMENTS

DE    3012418    8/1980
EP    0610584    12/1993
(Continued)

*Primary Examiner* — Stephen K Cronin
*Assistant Examiner* — Elizabeth Hadley
(74) *Attorney, Agent, or Firm* — Liell & McNeil

(57) ABSTRACT

A method of operating an electronically controlled dual fuel compression ignition engine includes injecting a pilot ignition quantity of liquid fuel into an engine cylinder from a dual fuel injector in an engine cycle during an auto ignition condition. An amount of gaseous fuel is also injected into the engine cylinder from the dual fuel injector in the same engine cycle. The amount of gaseous fuel is divided between a pre-mix quantity of gaseous fuel, which may be injected about 90° before top dead center, and a post ignition quantity of gaseous fuel that may be injected after top dead center, with both quantities being greater than zero. An engine controller may change a ratio of the pre-mix quantity of gaseous fuel to the post ignition quantity of gaseous fuel responsive to changing from a first engine speed and load to a second engine speed and load. The pilot ignition quantity of liquid fuel is compression ignited, which in turn causes the gaseous fuel to be ignited. A pre-mix quantity of liquid fuel may also be included in order to speed the combustion process at higher engine speeds.

20 Claims, 7 Drawing Sheets

(51) Int. Cl.
*F02D 19/06* (2006.01)
*F02D 19/08* (2006.01)
*F02M 43/04* (2006.01)
*F02M 45/08* (2006.01)
*F02M 63/00* (2006.01)

(56) References Cited

U.S. PATENT DOCUMENTS

| | | | |
|---|---|---|---|
| 5,199,398 A | 4/1993 | Nylund | |
| 5,458,292 A | 10/1995 | Hapeman | |
| 6,202,601 B1 * | 3/2001 | Ouellette et al. | 123/27 GE |
| 6,328,230 B1 | 12/2001 | Prillwitz et al. | |
| 6,336,598 B1 | 1/2002 | Touchette et al. | |
| 6,675,748 B2 * | 1/2004 | Ancimer et al. | 123/27 R |
| 6,907,870 B2 * | 6/2005 | zur Loye et al. | 123/594 |
| 7,007,661 B2 * | 3/2006 | Warlick | 123/27 GE |
| 7,124,959 B2 | 10/2006 | Baker et al. | |
| 7,373,931 B2 | 5/2008 | Lennox et al. | |
| 7,556,017 B2 | 7/2009 | Gibson | |
| 8,322,325 B2 * | 12/2012 | Rogak et al. | 123/304 |
| 8,459,576 B2 * | 6/2013 | Kim et al. | 239/585.1 |
| 8,733,326 B2 * | 5/2014 | Kim et al. | 123/525 |
| 8,794,212 B2 * | 8/2014 | Klingbeil et al. | 123/299 |
| 8,820,295 B2 * | 9/2014 | Coldren | 123/304 |
| 2002/0020388 A1 | 2/2002 | Wright et al. | |
| 2003/0024246 A1 | 2/2003 | Beck et al. | |
| 2004/0149255 A1 | 8/2004 | Zur Loye et al. | |
| 2007/0199539 A1 | 8/2007 | Lennox et al. | |
| 2011/0108631 A1 * | 5/2011 | Mumford et al. | 239/5 |
| 2011/0192367 A1 | 8/2011 | Reitz et al. | |
| 2011/0224884 A1 * | 9/2011 | Williams et al. | 701/102 |

FOREIGN PATENT DOCUMENTS

| | | |
|---|---|---|
| EP | 0610585 | 12/1993 |
| EP | 0778410 | 6/1996 |
| EP | 0546985 | 3/1999 |
| GB | 549419 | 4/1941 |
| GB | 2270346 | 9/1994 |
| JP | 59122722 | 7/1984 |
| JP | 61116060 | 3/1986 |
| JP | 61229969 | 10/1986 |
| JP | 63208664 | 8/1988 |

* cited by examiner

DUAL FUEL INJECTION COMPRESSION IGNITION ENGINE AND METHOD OF OPERATING SAME

TECHNICAL FIELD

The present disclosure relates generally to electronically controlled dual fuel compression ignition engines, and more particularly to varying premixed and post ignition quantities of gaseous fuel injection responsive to changes in engine speed and load.

BACKGROUND

Gaseous fuel engines are known for their ability to burn clean relative to their compression ignition engine counterparts. However, gaseous fuels are well known for the difficulty in attaining successful ignition. Some gaseous fuel engines utilize a spark plug, whereas other engines are known for utilizing a small amount of distillate diesel fuel that is compression ignited to in turn ignite a larger charge of gaseous fuel. In these engines, the gaseous fuel may be supplied to the engine intake manifold or metered directly into individual cylinders where it is mixed with air prior to being ignited responsive to the pilot diesel injection near top dead center. While this strategy may reduce NOx due to a cooler combustion, hydrocarbon emissions may be relatively high and there is no ability to control combustion characteristics, such as reaction rate, to accommodate different engine operating conditions.

U.S. Pat. No. 7,373,931 teaches a dual fuel engine that utilizes a small quantity of compression ignited distillate diesel fuel to ignite a larger charge of gaseous fuel injected after ignition. This reference teaches the use of a fuel injector with nested needle valve members to facilitate injection of both the gaseous and liquid fuels from the same injector into each engine cylinder. In other words, the patent owner teaches direct injection of gaseous fuel into the engine cylinder after a pilot quantity of diesel fuel has been injected and ignited. While the reference claims that this strategy provides improved efficiencies over the counterpart gaseous fuel engines discussed previously, other emissions problems and power inefficiencies, especially at higher speeds and loads may be present.

The present disclosure is directed toward one or more of the problems set forth above.

SUMMARY OF THE DISCLOSURE

In one aspect, a method of operating an engine includes injecting a pilot ignition quantity of liquid fuel into an engine cylinder from a dual fuel injector in an engine cycle during an auto ignition condition in the engine cylinder. An amount of gaseous fuel is injected into the engine cylinder from the dual fuel injector in the engine cycle. The amount of gaseous fuel is divided to include a pre-mix quantity and a post ignition quantity of gaseous fuel, which are both greater than zero. A ratio of the pre-mix quantity to the post injection quantity of gaseous fuel is changed responsive to changing from a first engine speed and load to a second engine speed and load. The pilot ignition quantity of liquid fuel is compression ignited. The gaseous fuel is ignited after the pilot ignition quantity of liquid fuel is compression ignited.

In another aspect, an electronically controlled compression ignition dual fuel engine includes a dual fuel injector positioned for direct injection into an engine cylinder. A source of gaseous fuel is fluidly connected to the dual fuel injector. A source of liquid fuel is also connected to the dual fuel injector. An electronic controller is in control communication with the dual fuel injector and includes an injection control algorithm configured to signal injection of a pilot ignition quantity of liquid fuel, to an engine cylinder from dual fuel injector in an engine cycle. In addition, the electronic controller is configured to signal an amount of gaseous fuel into the engine cylinder from the dual fuel injector in the engine cycle. The amount of gaseous fuel includes a pre-mix quantity and a post ignition quantity which are both greater than zero. Finally the electronic controller is configured to change a ratio of the pre-mix quantity of gaseous fuel to the post ignition quantity of gaseous fuel responsive to changing from a first engine speed and load to a second engine speed and load.

DETAILED DESCRIPTION

Figure 1:
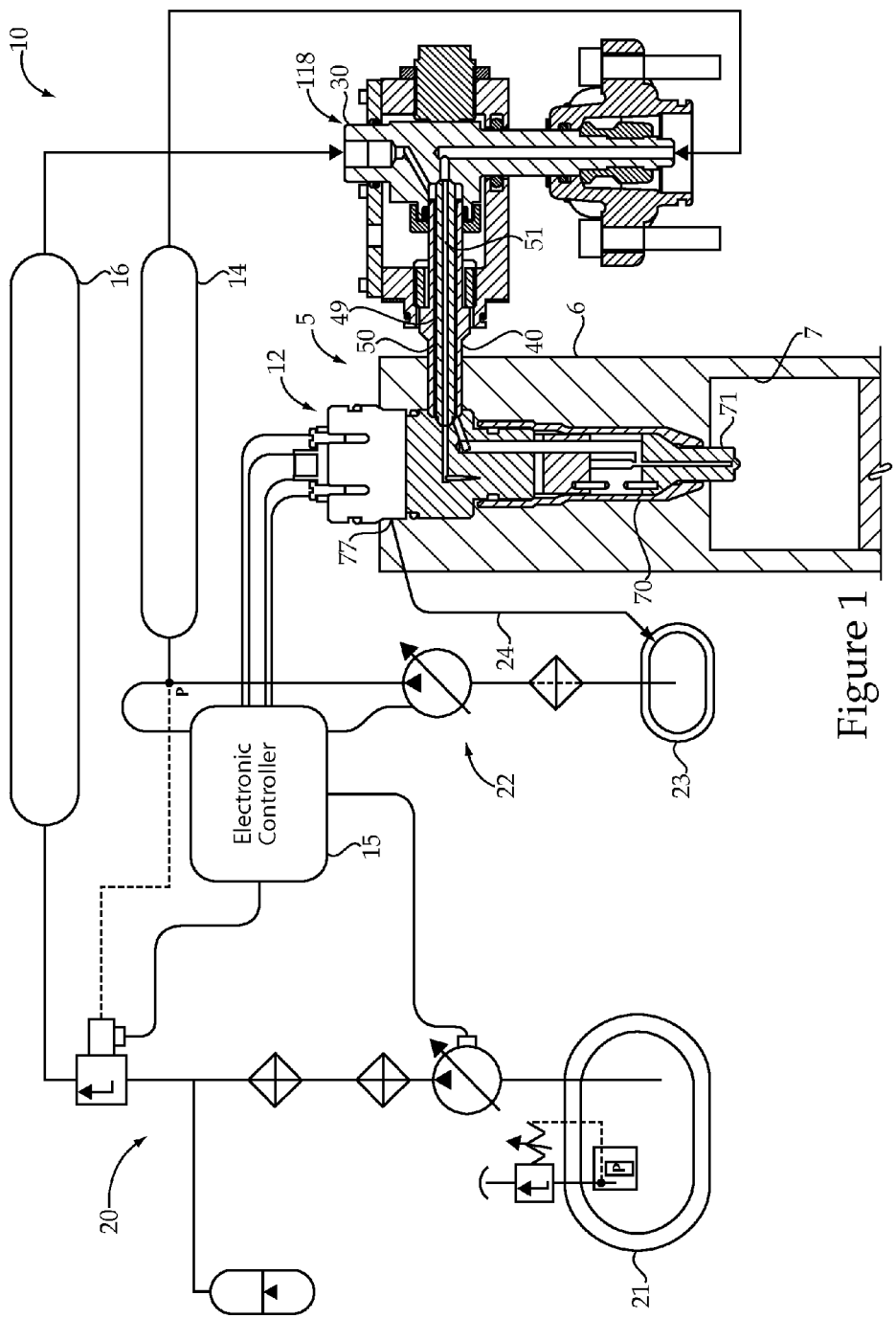
FIG. 1 is a schematic view of an engine and dual fuel common rail system according to the present disclosure.

Referring to FIG. 1, an engine 5 according to the present disclosure utilizes a dual fuel common rail system 10. Engine 5 includes an engine housing 6 that defines a plurality of cylinders 7, only one of which is shown. The dual fuel system 10 includes a plurality of dual fuel injectors 12 (only one shown) that each include an injector body 70 with a tip component 71 positioned for direct injection of gaseous fuel and/ or liquid fuel into one of the engine cylinders 7. The dual fuel system 10 includes a plurality of outer tubes 50 and inner tubes 40 that each extend into engine housing 6 between a quill 30 and one of the fuel injectors 12. Each of the inner tubes 50 is compressed between a conical seat on an associated quill 30 and a conical seat on one of the fuel injectors 12. Thus, each engine cylinder 7 has one associated fuel injector 12, one outer tube 40, one inner tube 50 and one quill 30. The dual fuel system 10 includes a gaseous fuel common rail 16 that is fluidly connected to each of the fuel injectors 12 through one of the quills 30 and an outer passage 49 defined between an inner tube 50 and an outer tube 40. A liquid fuel common rail 14 is fluidly connected to each of the fuel injectors 12 through one of the quills 30 and an inner passage 51 defined by the inner tube 50.

An electronic controller 15 is in control communication with each of the fuel injectors 12 to selectively control the timing and quantity of both gaseous and liquid fuel injection events. Electronic controller 15 is also in control communication with a gas pressure control device 20 that is operably coupled to control the pressure in gaseous fuel common rail 16, and also in control communication with a liquid pressure control device 22 operably coupled to control the pressure in liquid fuel common rail 14. Although individual gases, such as methane, propane and the like are within the scope of the present disclosure, natural gas containing a mixture of gas species is particularly applicable to the present disclosure. In addition, the liquid fuel is chosen for the ability for compression ignition at the compression ratio of engine 5. For instance, the liquid fuel may be distillate diesel fuel or some other liquid fuel that is suitable for compression ignition to in turn ignite a charge of gaseous fuel in one of the engine cylinders 7. Thus, during normal operation of engine 5, auto ignition conditions will arise in the individual cylinder sometime during the compression stroke in an engine cycle, which includes an expansion stroke, an exhaust stroke and an intake stroke. Although compression ignition conditions for the liquid fuel may exist in the engine cylinder, pressures and temperatures are generally insufficiently high to auto ignite the gaseous fuel.

In the illustrated embodiment, natural gas is maintained in a liquid state in a cryogenic liquefied natural gas tank 21. A variable displacement cryogenic pump is controlled by electronic controller 15 to pump liquefied natural gas through filters and a heat exchanger for expansion into a gas that is maintained in an accumulator. The gas pressure control device 20 according to the present disclosure may include an electronically controlled valve that supplies a controlled quantity of gaseous fuel from the supply side (accumulator) to the gaseous fuel common rail 16. This described supply strategy for natural gas is particularly suitable when engine 5 is mounted on a moving machine, such as a mining truck or the like. On the otherhand, if engine 5 were stationary, a gas pressure control device may be connected to a source of available natural gas and then compressed and fed to gaseous fuel common rail 16 in a manner that is controlled by electronic controller 15 to maintain a desired pressure in the rail 16.

The liquid fuel supply to liquid fuel common rail 14 begins at a tank 23. In the illustrated embodiment, the liquid fuel pressure control device 22 includes a high pressure common rail fuel pump of a type well known in the art whose output can be controlled by electronic controller 15 to maintain some desired pressure in liquid common rail 14. Another alternative might include a fixed displacement pump and a rail pressure control valve that returns a quantity of the fuel back to tank 23 in order to control pressure in liquid fuel common rail 14. Any of these alternative strategies fall within the contemplated scope of the present disclosure.

In the event that engine 5 is utilized in a moving machine, the present disclosure contemplates liquefied natural gas tank 21 having a larger capacity (maybe 65% greater volume) than the distillate diesel fuel tank 23 in order to account for the expected ratios of consumption from both tanks when operating in a standard dual fueling configuration in which maybe over 90% of the fuel delivery to engine 5 is in the form of natural gas and less than 10% in the form of distillate diesel fuel, by mass. This difference in sizing of tanks 21 and 23 also accounts for the densities of the respective liquids as well as the different heating values of the two fuels, as well as accounting for the fact that the natural gas is stored as a liquid but injected as a gas, whereas the distillate diesel fuel is stored and injected as a liquid into engine 5. When operating in a dual fueling mode corresponding to standard operation, electronic controller 15 is configured to maintain the gaseous fuel common rail at a medium low pressure and the liquid fuel common rail 14 at a medium high pressure. If engine 5 is operating in a limp home fueling mode, the electronic controller 15 may be configured to maintain the gaseous fuel common rail 16 at a low pressure (maybe atmosphere pressure) and the liquid common rail 14 at a high pressure. For the sake of clarity, the identified high pressure is greater than the medium high pressure, which is greater than the medium low pressure, which is greater than the low pressure.

Figure 2:
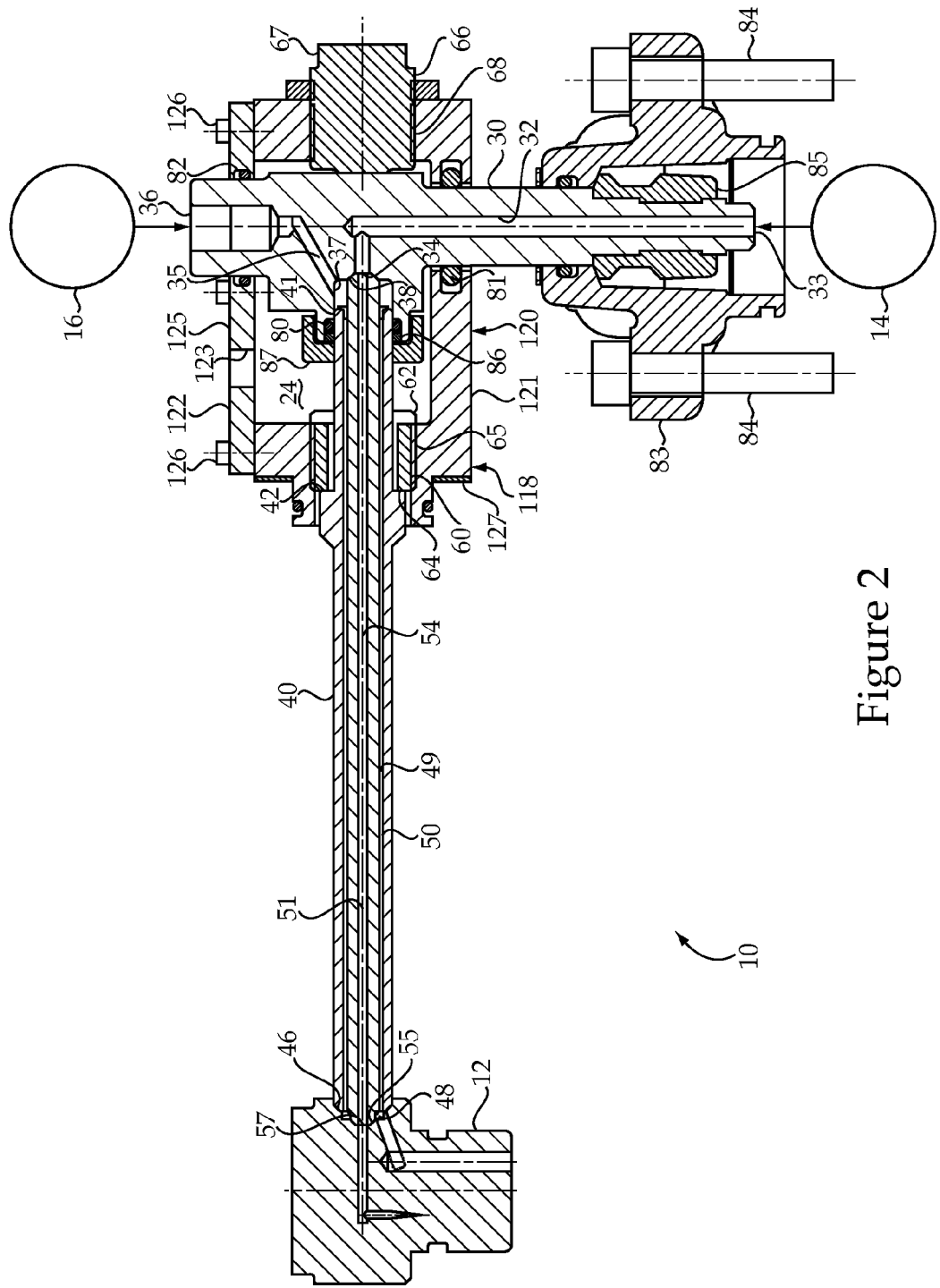
FIG. 2 is a side sectioned view of a portion of the dual fuel system of FIG. 1.

Referring to FIG. 2, the dual fuel common rail system 10 includes a coaxial quill assembly 118 fluidly connecting each fuel injector 12 with liquid and gas common rails 14, 16, respectively. Although the concepts of the present disclosure could apply to a variety of fuels for different types of engines, the illustrated embodiment is particularly suited for a gaseous fuel engine that utilizes distillate diesel fuel for compression ignition. In other words, an engine associated with dual fuel common rail system 10 might primarily burn liquefied natural gas supplied form second common rail 16, and ignite that charge in the engine combustion space by compression igniting a smaller charge of distillate diesel fuel from common rail 14 during a combustion event in one engine cycle.

Coaxial quill assembly 118 includes a quill 30 at least partially positioned in a block 120. The quill includes a first fuel passage 32 extending between a first fuel inlet 33, which is fluidly connected to first common rail 14, and a first fuel outlet 34. Quill 30 also defines a second fuel passage 35 extending between a second fuel inlet 36, which is fluidly connected to second common rail 16, and a second fuel outlet 37. Quill 30 is fluidly connected to rails 14 and 16 using known hardware (e.g., fittings) and techniques. Fuel from first common rail 14 is moved through an engine housing 6 (engine head) via an inner passage 51 through inner tube 50, while fuel from second common rail 16 is moved to fuel injector 12 in an outer passage 49 defined between inner tube 50 and an outer tube 40. Inner tube 50 may be of a familiar construction to those skilled in the art, in that it includes rounded or conical ends that are compressed between a conical seat 38 of quill 30 and an inner conical seat 55 of fuel injector 12. Thus, the fluid passage 51 within inner tube 50 extends between first fuel outlet 34 of quill 30 and an inner fuel inlet 57 of fuel injector 12. Outer tube 40, which may have no contact with inner tube 50, has an inner diameter larger than an outer diameter of inner tube 50 in order to define an elongate outer passage 49 that opens on one end to second fuel outlet 37 of quill 30 and at its other end to an outer fuel inlet 48 of fuel injector 12. Outer tube 40 includes a rounded or conical end that is compressed into sealing contact with outer conical seat 46 of fuel injector 12. The outer fuel inlet 48 opens between the inner diameter of tube 40 and the outer surface of inner tube 50. Thus, fuel injector 12 defines an outer conical seat 46 that concentrically surrounds an inner conical seat 55. In addition, the fuel injector 12 includes an inner fuel inlet 57 surrounded by the inner conical seat 55, and an outer fuel inlet 48 positioned between the inner conical seat 57 and the outer conical seat 46.

Outer tube 40 is compressed between quill 30 and the fuel injector 12. In particular, outer tube 40 includes a rounded or conical end in sealing contact with outer conical seat 46 and an opposite end received in a bore defined by quill 30. One end 41 outer tube 40 is sealed via an O-ring 80 that is positioned in a space 45 between outer tube 40 and quill 30. O-ring 80 is maintained in place against the pressure from second common rail 16 by a back up ring 86 held in place by a cap 87 threaded to quill 30. Outer tube 40 is compressed onto outer seat 46 of fuel injector 12 by an axial force applied to a load shoulder 42 by a compression load adjuster 60 that includes a contact surface 64 in contact with load shoulder 42. Compression load adjuster 60 includes outer threads 65 that mate with a set of inner threads defined by base 121 of block 120, and includes a tool engagement surface 62 located in hollow interior 124 of block 120 to facilitate adjusting a compression load on outer tube 40. Thus, leakage of the second fuel from common rail 16 to atmosphere is inhibited by setting a compression load on the outer tube 40 with compression load adjuster 60 above a predetermined threshold to facilitate a seal at outer conical seat 46, and by sealing the other end with o-ring 80.

Sealing at opposite ends of inner tube 50 is facilitated by a separate load adjuster 66 that includes threads 68 mated to internal threads defined by base 121 of block 120. Load adjuster 66 includes a tool engagement surface 67 located outside of block 20 that facilitates movement of compression load adjuster 66 along a common centerline 54. In other words, compression load adjuster 70 pushes along common centerline 54 against quill 30 to compress inner tube 50 between conical seat 38 of quill 30 and conical seat 55 of fuel injector 12. Because one end 41 of outer tube 40 can slide within quill 30, the respective compression loads on inner tube 50 and outer tube 40 can be adjusted independently to better insure proper sealing at all of the conical seats 38, 55 and 46. Thus, leakage of the first fuel originating from common rail 14 into the second fuel is inhibited by setting a compression load on the inner tube 50 above a predetermined threshold with compression load adjuster 66. In addition, leakage of the second fuel from common rail 16 into the first fuel from common rail 14 may include setting the pressure in common rail 14 higher than the pressure in common rail 16. Outer tube 40, inner tube 50, compression load adjuster 60, compression load adjuster 66, conical seat 38, inner conical seat 55 and outer conical seat 46 all share a common centerline 54. Other sealing strategies for one or both of inner tube 50 and outer tube 40 apart from that described in relation to the drawings also fall within the contemplated scope of the present disclosure.

As shown, quill 30 may be at least partially positioned within block 120, which includes a base 121 and a cover 122 that may be attached to base 121 by a plurality of fasteners 126. Base 121 may include a flange that facilitates attachment of block 120 to an engine head (housing 6) via bolts 128. As shown in the Figures, the first fuel inlet 33 and the second fuel inlet 36 of quill 30 may be located outside of block 120. A shim 127 may be included to adjust the distance between conical seat 38 and conical seat 57 to compensate for geometrical tolerances in the fuel system and engine components. Any of the second fuel that manages to leak past O-ring 80 into hollow interior 124 of block 120, may be vented to atmosphere via vent opening 123. Thus, vent opening 123 might be eliminated in a case where the fuel in common rail 16 is not gaseous at atmospheric pressure. Except for vent opening 123, hollow interior 24 may be substantially closed via an O-ring 81 that is in contact with quill 30 and block 120, and surrounds first fuel passage 32. In addition, a second O-ring 82 may be in contact with quill 30 and block 120, and surround the second fuel passage 35. Thus, vent opening 123 extends between hollow interior 125 and an outer surface 125 of block 120, which is exposed to atmosphere.

Coaxial quill assembly 118 may also include a flange 83, collar 85 and bolts 84 to facilitate a sealed fluid connection between quill 30 and common rail 14. Although co-axial quill assembly 118 is illustrated as including a separate block 120 and quill 30, those skilled in the art will appreciate that the functions and structures of those two components could be merged into a single component without departing from the present disclosure.

Figure 3:
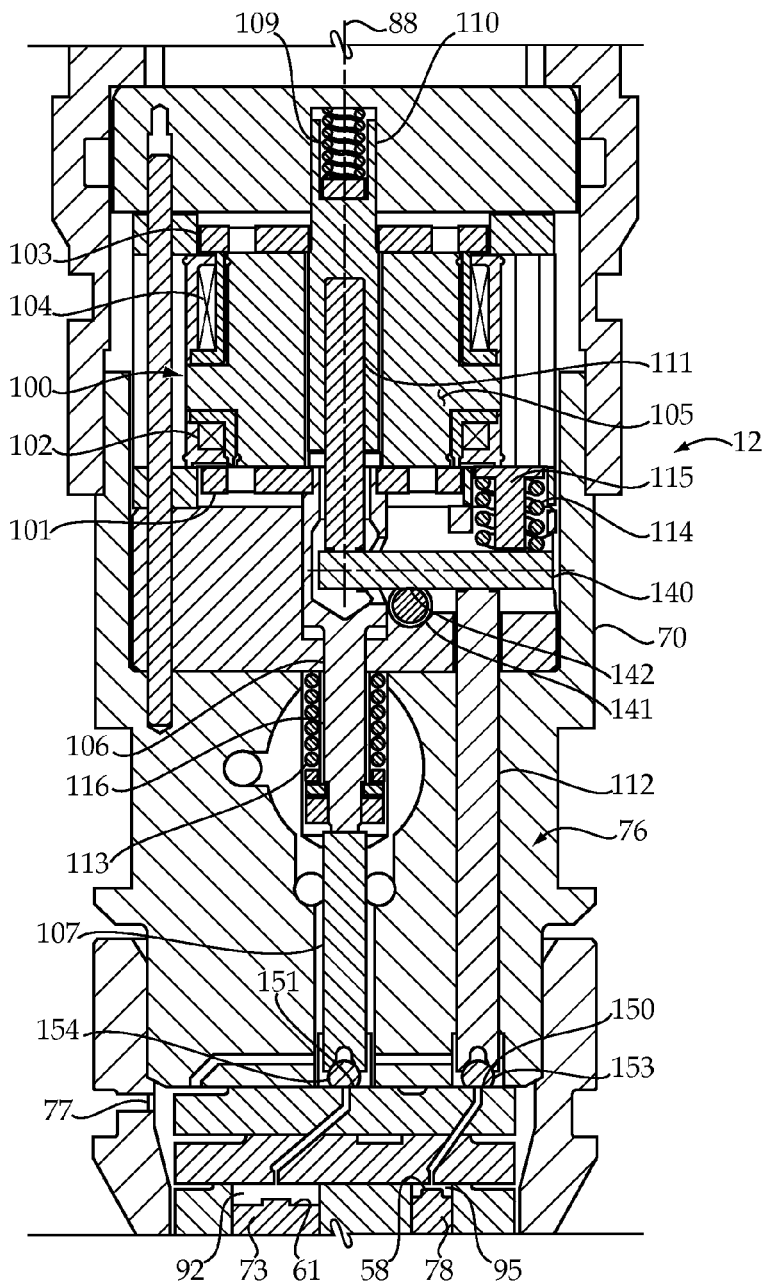
FIG. 3 is a sectioned side view of a top portion of one of the dual fuel injectors from FIG. 1.
Figure 4:
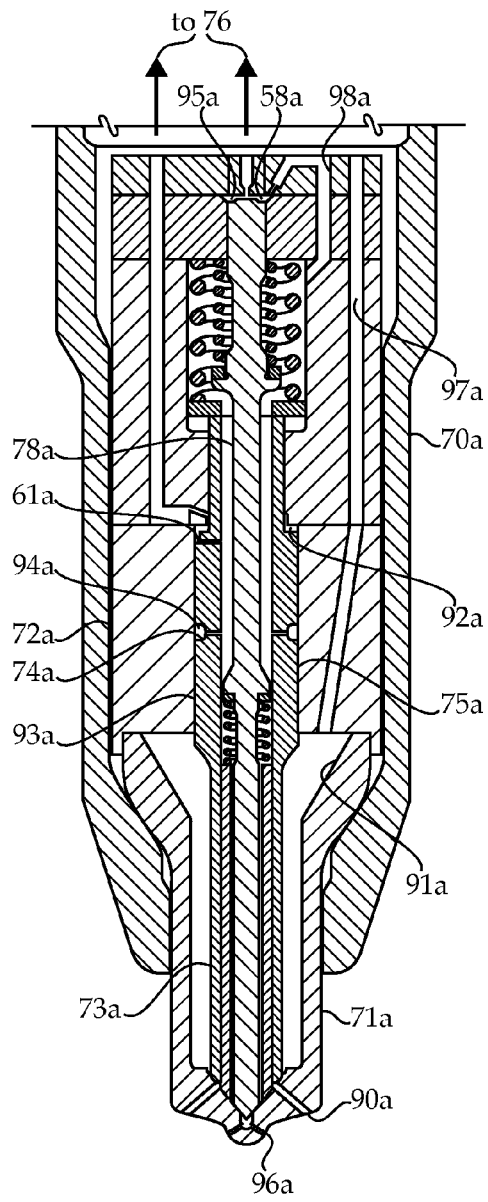
FIG. 4 is a sectioned side view of a bottom portion of a fuel injector according to one aspect of the present disclosure.
Figure 5:
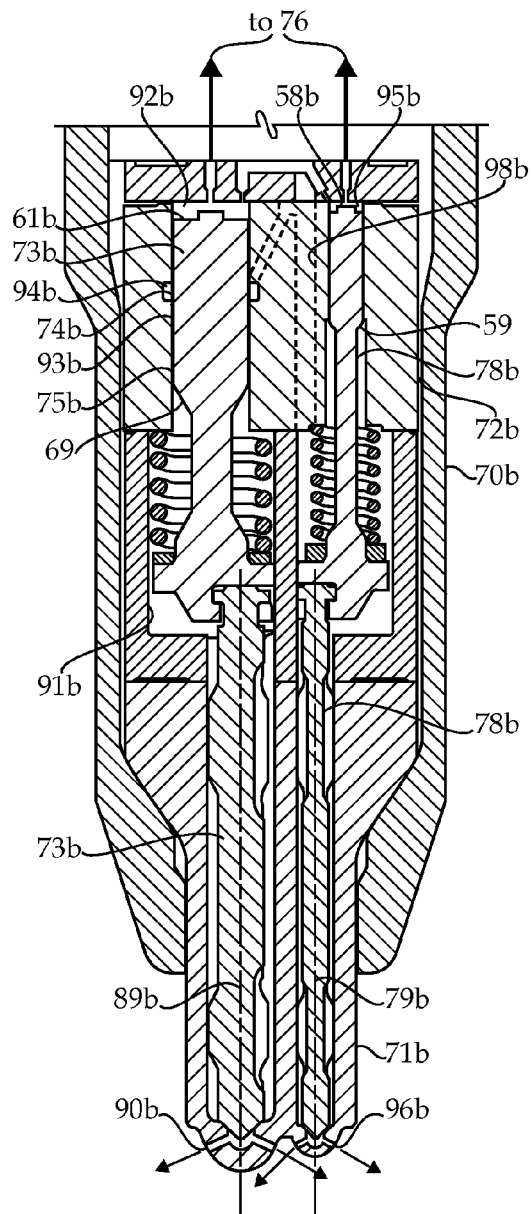
FIG. 5 is a sectioned side bottom portion view of a fuel injector according to another aspect of the present disclosure.

Referring now to FIGS. 3-5, each of the fuel injectors 12 includes two control valves 76 that are individually actuated via a dual solenoid actuator 100 in control communication with electronic controller 15. In the illustrated embodiment, the two control valves 76 are each two way valves that open and close respective passageways to a low pressure drain outlet 77. As shown in FIG. 1, drain outlet 77 is fluidly connected to tank 23 via a drain return line 24. Thus, those skilled in the art will recognize that all of the control functions for fuel injector 12 are performed using the liquid fuel as a hydraulic medium in a manner well known in the art. FIGS. 4 and 5 show two different versions of a bottom portion of fuel injector 12. FIG. 4 shows a version in which the fuel injector has concentric sets of gas nozzle outlets 90a and a liquid set of fuel nozzle outlets 96a, whereas FIG. 5 shows a configuration in which the gas nozzle outlets 90b are side by side with the liquid fuel nozzle outlets 96b. In the embodiment of FIG. 5, liquid needle valve member 78b moves along a centerline 79b, and gas needle valve member 73b moves along a centerline 89b that is parallel to, but offset from, centerline 79b. Identical features in the two different fuel injector versions are identified with the same numerals, but the numerals include an "a" in the case of the dual concentric configuration of FIG. 4, and include a designation "b" in the case of the side by side version of FIG. 5. In both versions, the respective gas needle valve member 73 and liquid needle valve member 78 seat at different locations on the same tip component 71 of the injector body 70.

As shown in FIG. 3, a dual solenoid actuator 100 may be utilized for controlling the two control valves 76 in different configurations to provide a noninjection configuration, a liquid or diesel fuel injection configuration, a gaseous fuel injection configuration, and even a combined injection configuration. Dual solenoid 100 is shown in its noninjection configuration with a first armature 101 in an unenergized position, a second armature 103 in an unenergized position and a lever 140 in a first angular orientation, which is horizontal in the illustrated embodiment. First armature 101 is connected to a pusher 106 that is in contact with valve pin 107 that in turn holds valve member 154 in a downward closed position in contact with flat seat 151 under the action of spring 113. When valve member 154 is in its downward closed position, pressure in pressure control chamber 92 is high (rail pressure) and acts upon closing hydraulic surface 61 of gas needle valve member 73 to maintain it in its downward closed position to close gas nozzle outlets 90. Second armature 103 is connected to a pusher 110 that is urged into contact with a lever pin 111 by an over travel spring 109. Lever pin 111 is in contact with one end of lever 140 on a left hand side of pivot pin 141. A spring 114 pushes downward on an opposite side of lever 140 to urge valve pin 112 downward to push valve member 153 to a closed position in contact with flat valve seat 150. When valve member 153 is in its downward closed position, pressure in second pressure control chamber 95 is high (rail pressure) and acts on closing hydraulic surface 58 to help urge diesel needle valve member 78 downward to close liquid nozzle outlets 96. When armature 101 and 103 are in their unenergized positions, coils 102 and 104 may be in respective unenergized positions. It should be noted that dual solenoid actuator 100 utilizes a common or shared stator 105 upon which both coils 102 and 104 are mounted. Thus, magnetic flux necessary to move armature 101 or armature 103, or both is carried by shared stator 105.

In order to initiate a gas injection event, dual solenoid actuator 100 is changed to a first fuel injection configuration by energizing coil 102 to pull armature 101 upward toward an energized position until the movement of pusher 106 (and armature 101) is arrested by stop sleeve 116. When this occurs, valve member 154 moves to an open position out of contact with the flat seat 151 to fluidly connect pressure control chamber 92 to low pressure drain 77. When this occurs, the pressure acting on closing hydraulic surface 61 decreases and is overcome by the pressure acting on opening hydraulic surface 69, causing gas needle valve member 89 to move upward to open gas nozzle outlets 90 to the gas fuel inlet 48 (FIG. 2). When it becomes time to end the gaseous fuel injection event, coil 102 is de-energized. This allows spring 113 to push valve member 154 back downward into contact with flat seat 151 to increase pressure on closing hydraulic surface 61, causing gas needle valve member 73 to move downward to close the gas set of nozzle outlets 90.

A liquid fuel injection event may be initiated by energizing coil 104 to move armature 103 from its unenergized position to its energized position closer to coil 104. When this occurs, pusher 110 is moved along with pusher 111 to pivot lever 140 about pivot pin 141 to a second angular orientation. The rotation of lever 140 continues until coming into contact with stop pin 115. The difference between the first and second angular orientations may be so slight as to barely perceptible to the eye. This rotation of lever 140 allows push pin 112 to move upward and permit valve member 153 to move to an open position out of contact with flat seat 150. When this occurs, pressure control chamber 95 becomes fluidly connected to low pressure drain 77 causing the pressure on closing hydraulic surface 58 to drop. When this occurs, the pressure acting on opening hydraulic surface 59 causes diesel needle valve member 78 to move upward to open the liquid set of nozzle outlets 96 to the liquid fuel inlet 57 (FIG. 2). When it comes time to end a liquid fuel injection event, coil 104 may be de-energized. Spring 114 then acts on lever 140 to urge lever 140 back to its first angular orientation and pins 110 and 111 move armature 103 back upward toward the unenergized position. At the same time, lever 140 acts to push valve pin 112 downward to move valve member 153 back to its closed position in contact with flat valve seat 150 to close the fluid connection between pressure control chamber 95 and low pressure drain 77. When this occurs, pressure on closing hydraulic surface 58 again rises causing diesel needle valve member 78 to move downward to close the liquid set of nozzle outlets 96.

Because dual solenoid actuator 100 can cause valve member 154 and 153 to move to their open positions independently, the dual solenoid actuator 100 also can facilitate a combined injection configuration in which both coils 102 and 104 are energized simultaneously. In the illustrated embodiment, lever 140 is configured to pivot about pivot pin 141 along a pivot axis that goes into and out of the page and is perpendicular to the previously described movement of armatures 101 and 103. Armature 101, coil 102, armature 103 and coil 104 may share a common centerline 88 that is perpendicular to the pivot axis of lever 140.

Figure 6:
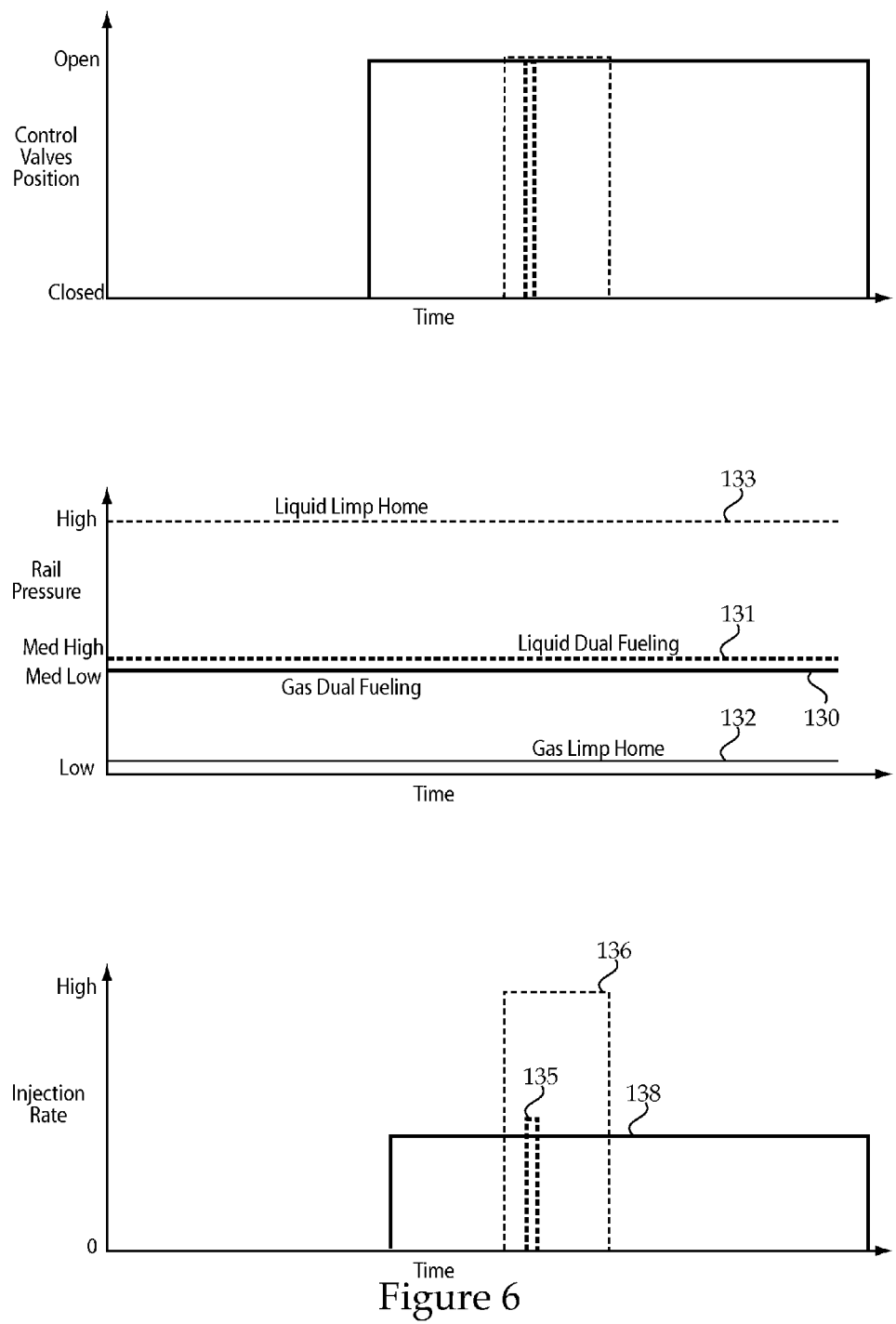
FIG. 6 is a series of graphs showing control valve positions, gaseous and liquid fuel rail pressures and injection rates verses time for the dual fuel system of FIG. 1 when operating in a dual fueling mode and a limp home mode.

Referring now to FIG. 6, during a gas injection event, one of the two control valves 76 is actuated to fluidly connect a pressure control chamber 92 to drain outlet 77. In other words, valve member 154 moves into and out of contact with valve seat 151 responsive to movement of armature 101 between an unenergized position and an energized position, respectively. When this is done, pressure in control chamber 92 drops allowing a gas needle 73 to lift toward an open position against the action of a biasing spring to fluidly connect a gas nozzle chamber 91 to gas nozzle outlets 90. When fuel injector 12 is in a gas injection configuration, the liquid fuel common rail 14 is fluidly connected to drain outlet 77 since pressure control chamber 92 is always fluidly connected to a liquid nozzle supply passage 98 through a small orifice. Liquid nozzle supply passage 98 is always fluidly connected to inner fuel inlet 57 (FIG. 2). When the two control valves 76 are in a liquid injection configuration, the other of the two valves is actuated to fluidly connect the liquid common rail 14 to the drain outlet 77 through a second pressure control chamber 95, which is also always fluidly connected to high pressure in liquid nozzle supply passage 98. In other words, control valve member 153 moves into and out of contact with valve seat 150 responsive to movement of armature 103 between an unenergized position and an energized position, respectively. The two control valves 76 also have a combined injection configuration at which both of the two control valves 76 are moved to an open position so that the liquid fuel common rail 14 is fluidly connected to the drain outlet 77 through the first pressure control chamber 92 and in parallel through the second control pressure chamber 95. Finally, the two control valves 76 have a non-injection configuration at which the liquid fuel common rail 14 is blocked from the drain outlet 77 by having both of the two control valves 76 in a closed position.

In both versions of fuel injector 12 in FIGS. 3 and 4, a gas needle valve member 73 is positioned completely inside of injector body 70 with a guide surface 75 extending in a guide component 72 of injector body 70 between the first pressure control chamber 92 and the gas nozzle chamber 91. The gas nozzle chamber 91 is always fluidly connected to the gaseous fuel common rail 16, and is therefore at about the same pressure as the gaseous fuel common rail 16. A segment 74 of gas needle 73 and the guide component 72 define a portion of an annular volume 94 that is always fluidly connected to liquid common rail 14 via a branch passage that is fluidly connected to liquid nozzle supply passage 98. This structure may help to maintain lubricity in the guide clearance 93.

Figure 7:
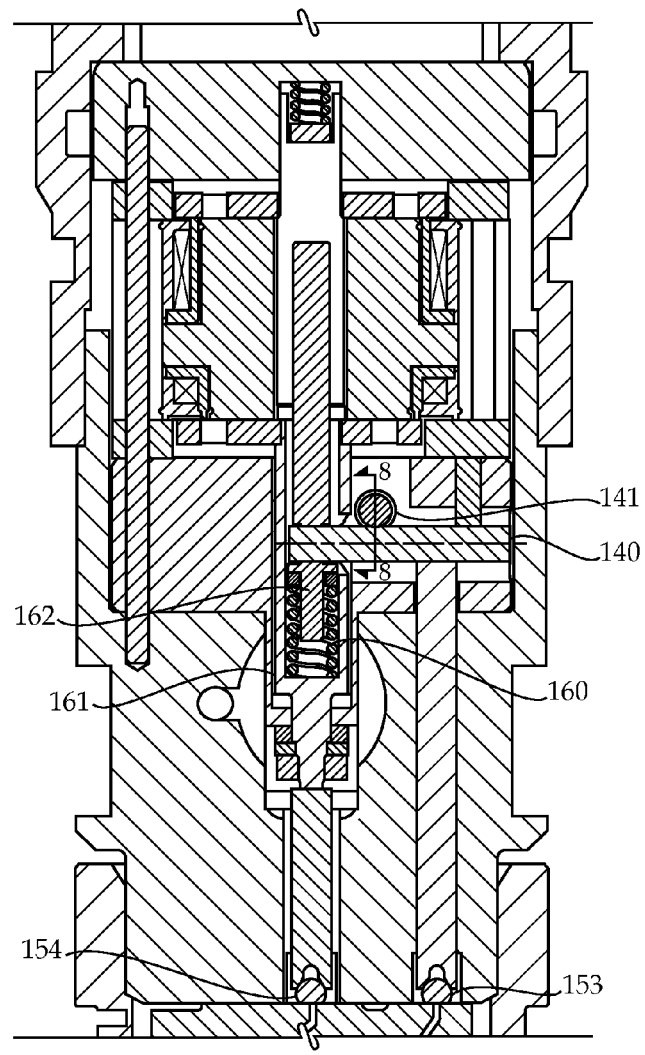
FIG. 7 is a sectioned side view of a dual fuel injector according to another aspect of the present disclosure.
Figure 8:
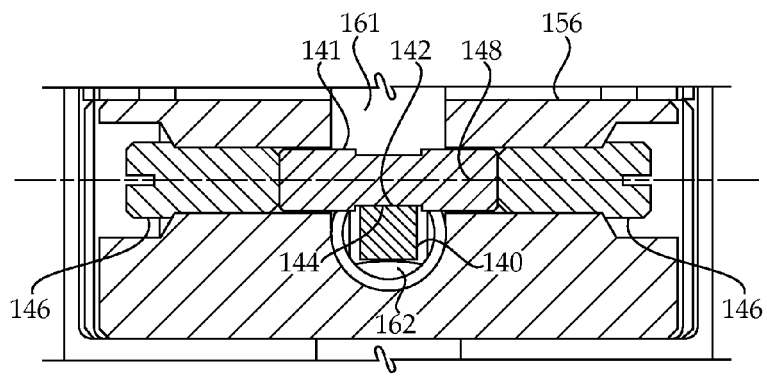
FIG. 8 is an enlarged section view of the lever area of the fuel injector of FIG. 7, as viewed along section lines 8-8.

Referring briefly in addition to FIG. 7, an alternative of the upper portion of fuel injector 12 is illustrated that differs from the embodiment of FIG. 3 in that a single spring is utilized to bias both control valve members 153 and 154 to their downward closed positions. This is to be contrasted with the embodiment of FIG. 3 where a first spring 113 biases valve member 154 toward its closed position and a second spring 154 independently biases valve member 153 toward its closed position. In the embodiment of FIG. 7, the single spring 160 is positioned between a pusher 161 that acts on valve member 154 and a pin 162 that acts on valve member 153 via lever 140. In addition, the two embodiments differ by the lever 140 being above pivot pin 141 in FIG. 3 and below in FIGS. 7 and 8. Those skilled in the art will appreciate that the travel distances of the armatures 101 and 103 are controlled by locating stops that actually prevent the armatures 101 and 103 from coming in contact with shared stator 105 (FIG. 3). These stops can be located in a wide variety of different locations depending upon design choices well known in the art. In both the embodiments of FIGS. 3 and 7, the dual solenoid actuator 100 provides for armatures 101 and 103 moving along a common centerline 88 as best shown in FIG. 3. Referring to FIG. 8, the lever 140 may be inhibited from moving perpendicular to the pivot axis 148 by including an indentation 142 in lever 140 that receives pin 141. Movement of lever 140 along pivot axis 148 may be constrained by positioning lever 140 in a groove 144 defined by pivot pin 141. The side walls of groove 144 serving as limits to the movement of lever of 140 along pivot axis 148. Finally, pivot pin 141 may be located in a stack component 156 of injector body 70 by a pair of centering screws 146 as best shown in FIG. 8.

INDUSTRIAL APPLICABILITY

The dual fuel common rail system 10 of the present disclosure finds general applicability to any engine that utilizes two fuels in the combustion space of an associated engine. These two fuels may be the same fuel at two different pressures, or may, as in the illustrated embodiment be different fuels. The present disclosure finds particular applicability in gaseous fuel engines that utilize a relatively large charge of natural gas that is ignited via compression ignition of a small charge of distillate diesel fuel originating from common rail 14. The coaxial quill assembly 118 of the present disclosure can facilitate movement of both fuels to a fuel injector 12 mounted in the head 6 of an engine 5 via a single bore through the engine head associated with each fuel injector 12 of the engine 5. This strategy conserves valuable space in and around the engine, and potentially prevents a fuel containment junction with a leak path to the crank case.

By utilizing a block 120 that is bolted to the outer surface of the engine head, separate load adjusters 60 and 66 can be utilized to independently load the inner tube 50 and outer tube 40 onto the conical seats 57 and 46, respectively of fuel injector 12 to inhibit fuel leakage between the fuels and to inhibit fuel leakage to atmosphere outside of fuel injector 12, while accounting for slight dimensional differences associated with each fuel injector fluid connection.

When in operation, the first fuel (distillate diesel) at a first pressure moves from first common rail 14 through the first fuel passage 32, through inner tube 50 and into fuel injector 12. The second fuel (natural gas) at a second pressure is moved from the second common rail 16 through the second fuel passage 35, through the outer passage 49 between outer tube 40 and inner tube 50 and into fuel injector 12. Leakage of the second fuel to the first fuel may be inhibited by setting the pressure in common rail 14 to a medium high pressure (maybe about 40 MPa) higher than the pressure in common rail 16 to medium low pressure (maybe about 35 MPa). Inhibiting leakage of the liquid fuel into the gaseous fuel includes setting a compression load on the inner tube 50 above a first predetermined threshold with the compression load adjuster 66 to create appropriate sealing forces on both ends of tube 50. Leakage of the second fuel to atmosphere may be inhibited by setting a compression load on the outer tube 40 above a second predetermined threshold with the second load adjuster 60 to create a seal between outer tube 40 and fuel injector 12. Leakage of gaseous fuel to atmosphere is inhibited by including at least one o-ring, such as o-ring 80 in contact with outer tube 40. Nevertheless, those skilled in the art will appreciate that other concentric tube supply arrangements could be utilized without departing from the present disclosure. However, in the illustrated embodiment, leakage and variations in geometrical tolerances in the various components of engine 5 and fuel system 10 can be accommodated by utilizing first and second compression load adjusters 60 and 66 to respectively adjust the compression loads in the outer tube 40 and the inner tube 50 individually.

The fuel system 10 according to the present disclosure also includes several subtle functions providing advantages over known dual fuel systems. Among these are independent injection control via separate valves and separate electrical actuators for each of the gas and liquid systems. Thus, the fuel injector 12 can be controlled to inject gaseous fuel only, liquid fuel only, both gaseous and liquid fuel simultaneously, and of course having non-injection mode when no injection occurs.

In addition, the dual solenoid actuator 100 conserves space without sacrificing performance capabilities. Although the migration of gaseous fuel into the liquid fuel is generally inhibited by maintaining the liquid fuel common rail 14 at a higher pressure than the gaseous fuel common rail 16, other subtle but important features assist in preventing such leakage. Cross leakage issues are also inhibited by locating the liquid fuel supply in the inner tube 50, and locating the gaseous fuel supply to injectors 12 in the outer passage 49 between inner tube 50 and outer tube 40. By locating these passageways concentrically, each fuel injector 12 can be supplied with both fuels via one passageway through the engine housing 6 (head) rather than two passageways. Lubricity of the moving components within the fuel injector 12 may be maintained by exposure to liquid diesel fuel. For instance, the guide clearance 93 associated with gas needle 73 is maintained with liquid diesel fuel to maintain lubricity, even though one end of the gas needle 73 is always exposed to gaseous fuel in gas nozzle chamber 91.

By utilizing the concentric supply strategy, the fuel system 10 of the present disclosure presents a potential opportunity for retrofitting existing engines with minimized engine cylinder head modifications. The structure of the several versions of fuel injectors 12 also inhibits the leakage of gaseous fuel into the engine cylinder by locating both the gaseous fuel nozzle outlets 90 and the liquid fuel nozzle outlets 96 in a single tip component 71, rather than via some nested needle strategy of a type known in the art. Thus, the fuel injector 12 of the present disclosure avoids stacked tolerances and other uncertainties by making each of the gas and liquid needle structures independent in their movement, seating and biasing features. The exception being the shared biasing spring 160 in FIG. 7. This strategy may better enable mass production of fuel injectors that perform consistently with the same control signals. Finally the engine 5 of the present disclosure contemplates both a normal dual fueling mode and a limp home mode in which only liquid fuel is injected. For instance, if a malfunction occurs in the gaseous fuel system or if the gaseous fuel supply is exhausted, the electronic controller 15 may cause or allow the engine to switch from a dual fueling mode to the limp home mode.

As best shown in FIG. 6, the dual fueling mode is characterized by a large gas injection quantity 138 and a small quantity injection 135 of liquid fuel. On the otherhand, the limp home mode may be characterized by no gas injection but a large quantity 136 liquid fuel injection. In addition, the normal dual fueling mode is characterized by the gas and liquid common rails 16 and 14 being maintained at medium low and medium high pressures, respectively. On the otherhand, the limp home mode may be characterized by the gaseous fuel common rail being allowed to decay to, or be maintained at, a low pressure, while pressure in the liquid common rail 14 is increased to a high pressure 133 (maybe greater than 100 MPa). When operating in the dual fueling mode, a relatively small injection of liquid distillate diesel fuel is compression ignited to in turn ignite a relatively large charge of gaseous fuel at least partially previously injected into the engine cylinder. On the otherhand, during a limp home mode, engine 5 functions as a somewhat conventional diesel engine in which a relatively large quantity of liquid fuel is injected at or around top dead center of the compression stroke to instantaneously ignite upon injection in a known manner.

Figure 9:
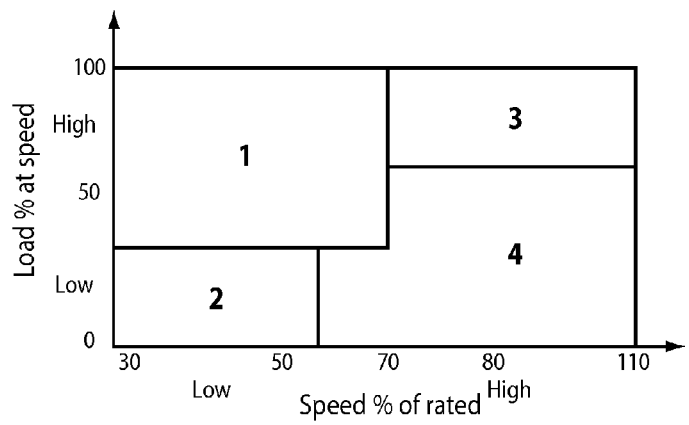
FIG. 9 is a graph of engine speed verses load that is divided into four different regions associated with four different fueling strategies according to the present disclosure.
Figure 10:
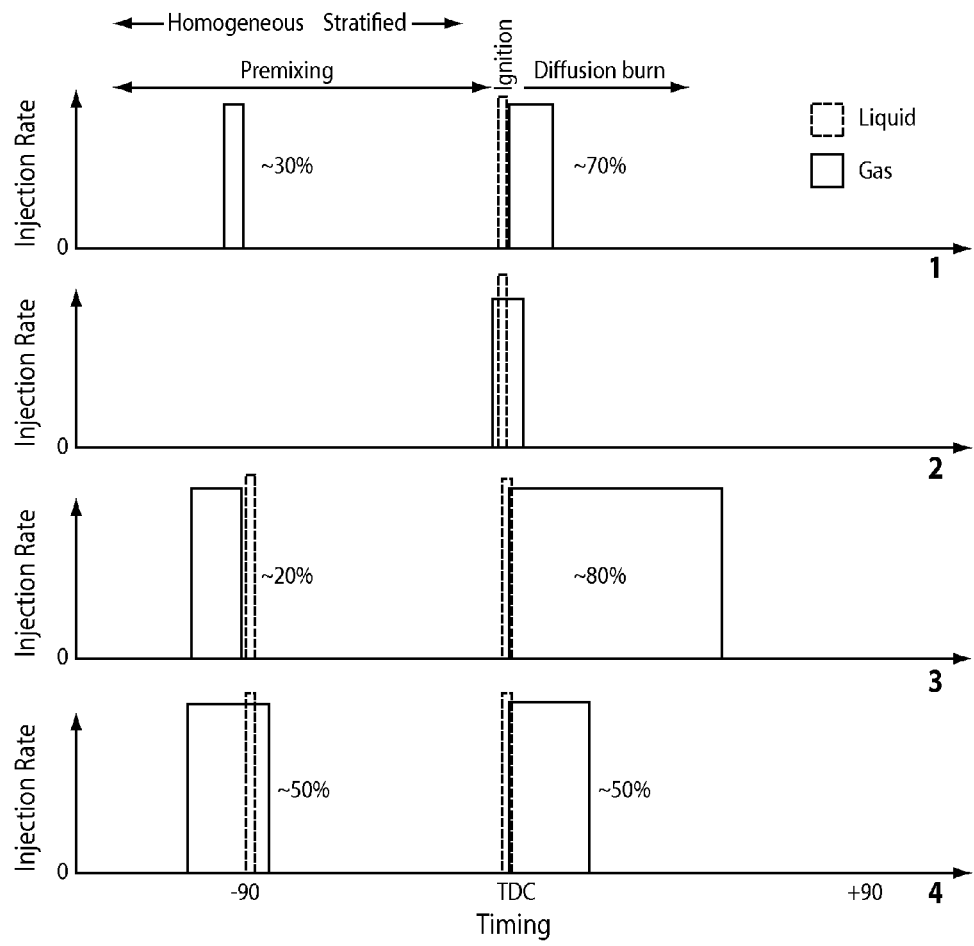
FIG. 10 is a graph of fuel injection rates verse time for each of the four regions identified in FIG. 9.

Referring now to FIGS. 9 and 10, the innovative hardware previously described allows for the versatility of supplying gaseous and diesel fuel in a variety of ways to accommodate different engine operating conditions. In its most basic sense, the strategy for fueling engine 5 (FIG. 1) may be divided into four regions illustrated in FIG. 9. Region 1 may correspond to high speed, low load; region 2 may correspond to low speed and low load; region 3 may correspond to high speed, high load; and, region 4 may correspond to low speed and high load. Nevertheless, those skilled in the art will appreciate that the concepts of the present disclosure could allow the engine operating range to be divided up into more or less than four different regions depending upon the desired characteristics and how granular the desire to control the various different regions may be. The shapes of the regions in FIG. 9 should not be considered limiting as the engine operating range could be divided into regions of many different shapes without departing from the present disclosure. In the illustrated embodiment, region 1 includes loads from about 30% to 100% over a speed range of 30-70% of rated engine speed. Region 2 covers loads from 0 to about 30% and speeds from about 30-60% of rated engine speeds. Region 3 is shown encompassing a load range from about 65% to 100% and a speed range from about 70-110% of rated. Region 4 is shown as a truncated rectangle that includes load ranges from 0-65% and speed ranges from about 60-110% of rated. Again, these divisions are only one of numerous possibilities of dividing the engine operating range into different regions for different fueling strategies. In all of regions 1, 3 and 4, corresponding to either high speed, high load or both, the gaseous fuel supplied to the engine cylinder in one engine cycle is divided between a pre-mix quantity and a post ignition quantity that are both greater than zero. In region 1, the pre-mix quantity may be on the order of about 30% and the post ignition quantity may be on the order of about 70%. As used in this disclosure, the phrase "about x %" means rounded to the nearest 10%.

The stratification of the pre-mix quantity of gaseous fuel may be varied to influence mixing and hence emissions. For instance, earlier gaseous fuel injection leads to more homogeneous mixing, which can result in lower combustion temperatures corresponding to lower NOx, but also result in higher hydrocarbon emissions. On the otherhand, later injection of the pre-mix quantity of gaseous fuel results in greater stratification to reduce hydrocarbons, but hotter combustion corresponding to higher NOx emissions. As shown in FIG. 10, in the illustrated embodiment, the pre-mix quantity of gaseous fuel is shown as being injected about 90° before top dead center. Sometime before top dead center, auto ignition conditions for the liquid fuel, but not the gaseous fuel, will arise in the engine cylinder. At around top dead center, a pilot ignition quantity of liquid fuel is injected into the engine cylinder in the same engine cycle as the pre-mix quantity of gaseous fuel. This pilot ignition quantity of liquid fuel compression ignites immediately upon injection in a manner well known in the art. This pilot ignition in turn ignites the pre-mixed gaseous fuel. In addition, the remainder of the gaseous fuel may then be injected over the beginning portion of the expansion stroke to facilitate a diffusion burn.

In region 1, about 70% of the gaseous fuel may be injected in a post ignition quantity as shown in FIG. 1. Thus, the strategy shown for region 1 is intended to be NOx limiting by pre-mixing about 30% of the gaseous fuel followed by a small pilot diesel injection just before top dead center, which is followed by a gas diffusion burn injection of about 70% of the gaseous fuel just following top dead center. In region 2, during low speed and low load conditions, a low gas substitution strategy may be utilized with both liquid and gaseous fuel being injected near top dead center as shown in the second graph of FIG. 10. Regions 3 and 4 are of interest for spanning the load range at higher speeds. Under these conditions, it may be desirable for faster combustion to aid efficiency, while still providing a NOx limiting pre-mixed gaseous fuel injection well before top dead center. Faster combustion may be facilitated by injecting a pre-mix quantity of liquid fuel into the engine cylinder prior to auto ignition conditions arising in the engine cylinder by appropriately selecting both the quantity and timing of the pre-mix quantity of liquid fuel so that early ignition of that liquid fuel and the pre-mix quantity of gaseous fuel can be avoided. In other words, there is a threshold of liquid fuel below which the liquid fuel will not auto ignite if the liquid fuel has been injected early enough to mix thoroughly enough with the pre-mix quantity of gaseous fuel and air in the cylinder to avoid early ignition knock. Thus, the pre-mix quantity of liquid fuel is more desirably ignited after the pilot ignition quantity of liquid fuel has been compression ignited at around top dead center. The presence of the pre-mixed liquid diesel fuel with the gaseous fuel serves to hasten the combustion rate to improve efficiency. In the illustrated embodiment of FIGS. 3 and 4, the pre-mix quantity of liquid fuel is shown injected about 90° before top dead center. The timing of this early diesel injection can be varied to achieve a desired stratification. In region 3, the pre-mix quantity of gaseous fuel is shown to be about 20% and the post ignition quantity of gaseous fuel is shown to be about 80%. Thus, the electronic controller for the engine 5 may inject a pre-mix quantity of liquid fuel at higher speeds, but omit such as injection at lower engine speeds. The early diesel injection is always performed before auto-ignition conditions arise in the cylinder. Those skilled in the art will appreciate that the quantity of liquid fuel injected is intended to hasten the later burn rate, but is not large enough to auto-ignite at the moment auto ignition conditions arise in the engine cylinder sometime before top dead center. In region 4, it may be desirable to divide the pre-mix quantity of gaseous fuel and the post ignition quantity of gaseous fuel to be about 50% each, while including an early injection pre-mix quantity of liquid diesel fuel in order to facilitate faster combustion at the higher speeds. Depending upon the desired characteristics, the pre-mix quantity of liquid fuel may be a fixed amount at all engine speeds, or may have some variability with engine speed and load without departing from the present disclosure.

When one views the different regions, especially regions 1, 3 and 4, it becomes apparent that the fueling strategy of the present disclosure teaches changing a ratio of the pre-mix quantity of gaseous fuel to the post ignition quantity of gaseous fuel responsive to changing from a first engine speed and load to a second engine speed and load, which may be characterized from moving from one region to another. In particular, the present disclosure teaches that there may be an advantage to decreasing the ratio of pre-mix gaseous fuel to post ignition gaseous fuel responsive to an increase in engine speed. In addition, the present disclosure teaches increasing the ratio of pre-mix gaseous fuel to post ignition gaseous fuel with a decrease in engine load. The fueling strategy outlined above has the advantage of leveraging the versatility of the hardware to produce better combinations of emissions, efficiency and power output from the engine at each of the different engine operating conditions. Finally, the present disclosure teaches that the stratification of the pre-mix charge, which may or may not include liquid diesel fuel, may be adjusted by adjusting a timing and quantity of the pre-mix gaseous fuel and the pre-mix liquid fuel, if applicable.

Referring back to FIG. 1, those skilled in the art will appreciate that the electronic controller 15 would include an injection control algorithm to carry out the fueling strategies shown in FIGS. 9 and 10. In particular, the injection control algorithm would be configured to signal a pilot ignition quantity of liquid fuel into the engine cylinder 7 from the dual fuel injector 12 at or around top dead center in an engine cycle. The injection control algorithm would also be configured to signal an amount of gaseous fuel into the engine cylinder 7 from the dual fuel injector 12 in the same engine cycle, with the amount of gaseous fuel including a pre-mix quantity and a post ignition quantity as per the regions 1, 3 and 4 of FIGS. 9 and 10, both quantities being greater than zero. Finally, the injection control algorithm may be configured to change a ratio of the pre-mix quantity of gaseous fuel to the post ignition quantity of gaseous fuel responsive to changing from a first engine speed and load to a second engine speed and load, which is illustrated by moving from one region to another in FIG. 9.

Electronic controller 15 may also be configured to signal injection of a pre-mix quantity of liquid fuel into the engine cylinder 7 from the dual fuel injector 12 in this same engine cycle prior to an auto ignition condition in engine cylinder 7, as per regions 3 and 4. In order to reduce NOx, the electronic controller may also be configured to set at least one of the pre-mix quantity of liquid fuel and the timing of that injection so that the pre-mix quantity of liquid fuel is not ignited until after the pilot ignition quantity of fuel is compression ignited at or around top dead center. When all of the regions are taken into account, the electronic controller can also be said to be configured to signal injection of a pre-mix quantity of liquid fuel at high engine speeds (regions 3 and 4), but omit signaling a pre-mix quantity of liquid fuel injection at lower speeds (regions 1 and 2). When the injection control algorithm reflects the graphs of FIGS. 9 and 10, it can also be said that electronic controller 15 is configured to decrease the ratio of pre-mix gaseous fuel to post ignition gaseous fuel responsive to an increase in engine speed, and is configured to increase the ratio responsive to a decrease in engine load. Finally, the electronic controller may also be configured to vary the stratification of a pre-mix charge, which includes gaseous fuel and may include liquid diesel fuel, by adjusting a timing of pre-mix injections relative to top dead center.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. For instance, although different hardware strategies have been illustrated, any hardware that can perform the fueling strategies illustrated in FIGS. 9 and 10 would fall within the scope of the present disclosure. Other aspects, features and advantages will be apparent upon an examination of the attached drawings and appended claims.

What is claimed is:

1. A method of operating an engine, comprising sequentially carrying out the steps of:
    changing a ratio of a premix quantity of gaseous fuel to a post ignition quantity of gaseous fuel as a function of at least one of a speed and a load of the engine, wherein each of the premix quantity of gaseous fuel and the post ignition quantity of gaseous fuel is greater than zero;
    injecting the premix quantity of gaseous fuel into an engine cylinder from a dual fuel injector in an engine cycle;
    injecting a pilot ignition quantity of liquid fuel into the engine cylinder from the dual fuel injector in the engine cycle during an autoignition condition in the engine cylinder;
    compression igniting the pilot ignition quantity of liquid fuel; and
    igniting the premix quantity of gaseous fuel after compression igniting the pilot ignition quantity of liquid fuel.

2. The method of claim 1, further comprising:
    injecting a premix quantity of liquid fuel into the engine cylinder from the dual fuel injector in the engine cycle prior to the autoignition condition in the engine cylinder; and
    igniting the premix quantity of liquid fuel after the compression igniting step.

3. The method of claim 2, wherein the step of injecting a premix quantity of liquid fuel occurs at high engine speeds, but is omitted at low engine speeds.

4. The method of claim 1 wherein the changing step includes decreasing the ratio responsive to an increase in engine speed.

5. The method of claim 4 wherein the changing step includes increasing the ratio responsive to a decrease in engine load.

6. The method of claim 5, further comprising:
    injecting a premix quantity of liquid fuel into the engine cylinder from the dual fuel injector in the engine cycle prior to the autoignition condition in the engine cylinder.

7. The method of claim 6, further comprising:
    igniting the premix quantity of liquid fuel after the compression igniting step.

8. The method of claim 7 wherein the step of injecting a premix quantity of liquid fuel occurs at high engine speeds, but is omitted at low engine speeds.

9. The method of claim 1, further comprising:
    changing a stratification of a premix charge by adjusting a timing of injection of the premix quantity relative to a top dead center timing.

10. An electronically controlled compression ignition dual fuel engine comprising:
    an engine cylinder;
    a dual fuel injector positioned for direct injection into the engine cylinder;
    a source of gaseous fuel fluidly connected to the dual fuel injector;
    a source of liquid fuel fluidly connected to the dual fuel injector; and
    an electronic controller in control communication with the dual fuel injector, wherein the electronic controller comprises an injection control algorithm configured to sequentially:
    change a ratio of a premix quantity of gaseous fuel to a post ignition quantity of gaseous fuel as a function of at least one of a speed and a load of the engine, wherein each of the premix quantity of gaseous fuel and the post ignition quantity of gaseous fuel is greater than zero;
    signal the premix quantity of gaseous fuel into the engine cylinder from the dual injector in the engine; and
    signal the dual fuel injector to inject a pilot ignition quantity of liquid fuel into the engine cylinder during an engine cycle.

11. The engine of claim 10 wherein the electronic controller is further configured to signal the dual fuel injector to inject a premix quantity of liquid fuel into the engine cylinder during the engine cycle prior to an autoignition condition in the engine cylinder.

12. The engine of claim 11 wherein the electronic controller is further configured to set at least one of the premix quantity of liquid fuel and an injection timing of the premix quantity of liquid fuel to cause ignition of the premix quantity of liquid fuel after compression ignition of the pilot ignition quantity of liquid fuel.

13. The engine of claim 12 wherein the electronic controller is further configured to signal injection of the premix quantity of liquid fuel at high engine speeds, but omit the signal for injecting the premix quantity of liquid fuel at low engine speeds.

14. The engine of claim 10 wherein the electronic controller is further configured to decrease the ratio responsive to an increase in engine speed.

15. The engine of claim 14 wherein the electronic controller is further configured to increase the ratio responsive to a decrease in engine load.

16. The engine of claim 15 wherein the electronic controller is configured to set at least one of the premix quantity of liquid fuel and an injection timing of the premix quantity of liquid fuel to cause ignition of the premix quantity of liquid fuel after compression ignition of the pilot ignition quantity of liquid fuel.

17. The engine of claim 16 wherein the electronic controller is further configured to signal injection of the premix quantity of liquid fuel at high engine speeds, but omit the signal for injecting the premix quantity of liquid fuel at low engine speeds.

18. The engine of claim 17 wherein the electronic controller is further configured to signal injection of the premix quantity of liquid fuel at high engine speeds, but omit the signal for injecting the premix quantity of liquid fuel at low engine speeds.

19. The engine of claim 10 wherein the electronic controller is further configured to change a stratification of a premix charge by adjusting a timing of injection of the premix quantity of gaseous fuel relative to a top dead center timing.

20. The engine of claim 10, wherein the dual fuel injector comprises gaseous fuel outlets and liquid fuel outlets, the gaseous fuel outlets being in fluid communication with the engine cylinder and in selective fluid communication with a gaseous fuel supply via a first valve, the liquid fuel outlets being in fluid communication with the engine cylinder and in selective fluid communication with a liquid fuel supply via a second valve, the gaseous fuel outlets being distinct from the liquid fuel outlets.

* * * * *